United States Patent
Liu et al.

(10) Patent No.: US 10,853,191 B2
(45) Date of Patent: Dec. 1, 2020

(54) METHOD, ELECTRONIC DEVICE AND COMPUTER PROGRAM PRODUCT FOR MAINTENANCE OF COMPONENT IN STORAGE SYSTEM

(71) Applicant: EMC IP Holding Company LLC, Hopkinton, MA (US)

(72) Inventors: Bing Liu, Tianjin (CN); Wei Lin, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 160 days.

(21) Appl. No.: 16/146,879

(22) Filed: Sep. 28, 2018

(65) Prior Publication Data

US 2019/0384508 A1 Dec. 19, 2019

(30) Foreign Application Priority Data

Jun. 15, 2018 (CN) .......................... 2018 1 0621204

(51) Int. Cl.
*G06F 11/14* (2006.01)
*G06F 3/06* (2006.01)
*H04L 12/24* (2006.01)

(52) U.S. Cl.
CPC ........ *G06F 11/1466* (2013.01); *G06F 3/0617* (2013.01); *H04L 41/12* (2013.01)

(58) Field of Classification Search
CPC ..... G06F 3/0617; G06F 11/1466; H04L 41/12
See application file for complete search history.

(56) References Cited

U.S. PATENT DOCUMENTS

| | | | | |
|---|---|---|---|---|
| 7,757,116 B2* | 7/2010 | Brown | ................ | G06F 11/1482 714/13 |
| 7,950,007 B2* | 5/2011 | Mohindra | ................. | G06F 8/60 709/230 |
| 9,935,823 B1* | 4/2018 | Rosh | ........................ | H04L 41/22 |
| 10,333,820 B1* | 6/2019 | Wang | ...................... | H04L 41/12 |
| 10,387,287 B1* | 8/2019 | Wu | ...................... | G06F 11/3006 |
| 2009/0144720 A1* | 6/2009 | Roush | ........................ | G06F 8/65 717/171 |
| 2016/0170841 A1* | 6/2016 | Yarnell | ............... | G06F 11/1451 714/19 |

* cited by examiner

*Primary Examiner* — Joseph R Kudirka

(74) *Attorney, Agent, or Firm* — Chamberlain, Hrdlicka, White, Williams & Aughtry

(57) ABSTRACT

Embodiments of the present disclosure relate to a method, electronic device and computer program product for maintaining components of a storage system. The method includes obtaining a dependency graph representing a topology of the storage system, determining a target node corresponding to the target component from the dependency graph, determining a type of the target component from information associated with the target node, and managing maintenance of the target component based on the type of the target component and a successor relationship in a dependency of the target node.

18 Claims, 10 Drawing Sheets

METHOD, ELECTRONIC DEVICE AND COMPUTER PROGRAM PRODUCT FOR MAINTENANCE OF COMPONENT IN STORAGE SYSTEM

FIELD

Embodiments of the present disclosure generally relate to a storage system, and more specifically, to a method, electronic device and computer program product for maintaining a component of a storage system.

BACKGROUND

A maintenance operation for a component of a storage system may have a great impact on business running of the storage system. Typically, a technical support engineer will schedule a downtime with a user and then maintain the storage system offline. This deteriorates the user experience because the user is unable to use the storage system during the downtime.

SUMMARY

Embodiments of the present disclosure provide a method, electronic device and computer program product for maintaining a component of a storage system.

One aspect of the present disclosure provides a method of maintaining a component of a storage system. The method comprises obtaining a dependency graph representing a topology of the storage system, the dependency graph comprising nodes and directed edges between the nodes, the nodes corresponding to respective components of the storage system, and each of the directed edges pointing to a predecessor node from a successor node having a dependency. The method further comprises determining a target node corresponding to the target component from the dependency graph in response to a target component of the storage system to be maintained. The method further comprises determining a type of the target component from information associated with the target node. In addition, the method may further manage maintenance of the target component based on the type of the target component and a successor relationship in a dependency of the target node.

One aspect of the present disclosure provides an electronic device. The electronic device comprises at least one processing unit and at least one memory coupled to the at least one processing unit and storing instructions executable by the at least one processing unit. The instructions, when executed by the at least one processing unit, cause the electronic device to perform a method, the method comprising: obtaining a dependency graph representing a topology of a storage system, the dependency graph comprising nodes and directed edges between the nodes, the nodes corresponding to respective components of the storage system, and each of the directed edges pointing to a predecessor node from a successor node having a dependency; in response to a target component of the storage system to be maintained, determining a target node corresponding to the target component from the dependency graph; determining a type of the target component from information associated with the target node; and managing maintenance of the target component based on the type of the target component and a successor relationship in a dependency of the target node.

One aspect of the present disclosure provides a computer program product being tangibly stored on a non-transient computer-readable medium and comprising machine-executable instructions which, when executed, cause a machine to perform a method, in accordance with any of the aforementioned aspects of the present disclosure.

This Summary is provided to introduce a selection of concepts that are further described below in the Detailed Description in a simplified form. This Summary is not intended to identify key features or essential features of the claimed subject matter, nor is it intended to be used to limit the scope of the claimed subject matter.

BRIEF DESCRIPTION OF THE DRAWINGS

The above and other objectives, features and advantages of the present disclosure will become more apparent from more detailed description of some embodiments of the present disclosure with reference to the accompanying drawings, in which the same reference symbols are used to indicate the same elements.

DETAILED DESCRIPTION OF EMBODIMENTS

Figure 1:
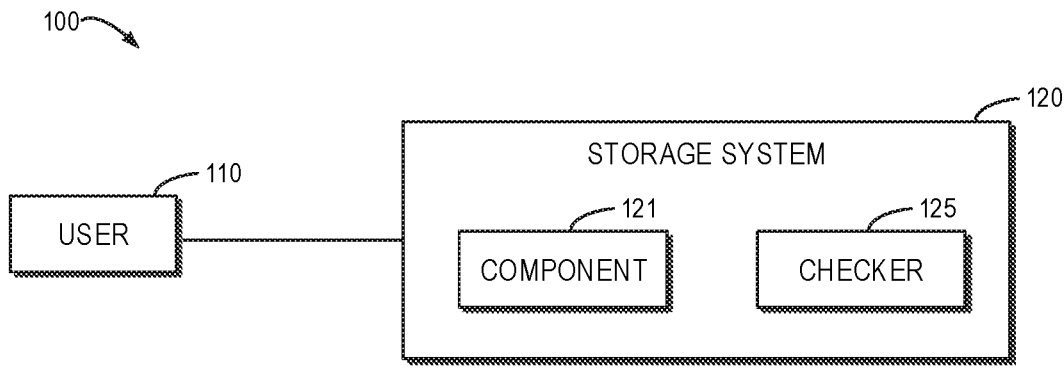
FIG. 1 illustrates a schematic diagram of an example environment for maintaining a component of a storage system.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. Rather, those embodiments are provided for thorough and complete understanding of the present disclosure, and completely conveying the scope of the present disclosure to those skilled in the art.

The term "comprise" and its variations used in the present disclosure mean comprising in an open-ended sense, i.e. "include without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may refer to different or the same objects.

Other explicit and implicit definitions might further be included in the following description.

It is noted that the term "component" used herein may refer to hardware, software or firmware, and "component" and "device" may be used interchangeably. The term "maintaining a component of a storage system" used herein may refer to replacing or upgrading any hardware, software or firmware in a storage system. In other words, the term "maintain" may be used interchangeably with "replace" or "upgrade" herein. The term "non-disruptive maintenance" used herein may refer to being able to maintain a component while the storage system is operating normally, without requiring system downtime or offline.

Due to product upgrading, disk error and the like, there is a need of maintaining a component of a storage system (for example, replacing a disk array). Existing component maintaining methods have their own defects. For example, because the maintenance operation for a component may have a great impact on business running of the storage system, a technical support engineer typically schedules a downtime with a user and then maintains the storage system offline. This may be called "offline component maintenance." However, as the user is unable to use the storage system during the downtime, this offline component maintenance method deteriorates the user experience.

A technical solution based on a system-level high availability may also be utilized for component maintenance, in which a backup storage system will take over business of the storage system to be maintained. For example, when a technical support engineer detects a bad small logical interface card of a serial attached small computer system interface (SAS SLIC), the node to which SLIC is attached is required to be taken offline, and the bad card is then replaced with a new card. In a high available environment, if the node is an active node in an active-passive configuration, a system-level failover will be triggered, and the storage system to be maintained will be entirely replaced with the backup storage system. This incurs a high computing cost and resource cost.

Moreover, an online disk firmware maintenance method based on a redundant array of independent drives (RAID) may also be utilized, in which a maximum number of disks undergoing firmware maintenance at the same time cannot be beyond the RAID's fault tolerance capability. However, this method is only effective for disk-level maintenance. In spite of being a non-disruptive maintenance, it is not generic for all kinds of component maintenance.

Embodiments of the present disclosure provide a generic non-disruptive maintenance solution which may maintain any hardware, software or firmware in a storage system without business shutdown, to improve the high availability. The non-disruptive maintenance solution of the present disclosure may avoid a system-level failover using some simple check logic, thereby lowering the computing cost and resource cost.

FIG. 1 illustrates a schematic diagram of an example environment 100 for maintaining a component of a storage system. It is to be understood that the structure and function of the example environment 100 are depicted only for the purpose of illustration without suggesting any limitation to the scope of the present disclosure. Embodiments of the present disclosure may be embodied in different structures and/or functions.

As shown in FIG. 1, the example environment 100 may include a storage system 120. For example, the storage system 120 may be an enterprise storage system. The storage system 120 includes a component 121, such as a processor, expander, disk and the like. A user 110 may use the storage system 120. For example, the user 110 may search/query data stored in the storage system 120. In addition, the user 110 may maintain the storage system 120. When the component 121 of the storage system 120 is damaged or to be upgraded, the user 110 may replace the existing component 121 with a new component. The maintenance operation for the component 121 may have a great impact on the business running of the storage system 120. According to embodiments of the present disclosure, a checker 125 of the storage system 120 may determine, prior to performing maintenance, whether the system needs to be shut down for performing maintenance. In some circumstances, if the checker 125 determines that the component 121 may be maintained while the storage system 120 is operating normally, without a need of scheduling a system downtime, the component 121 may be maintained at background without impacting use of the user 110. The methods or functions described below may be performed by the checker 125.

Figure 2:
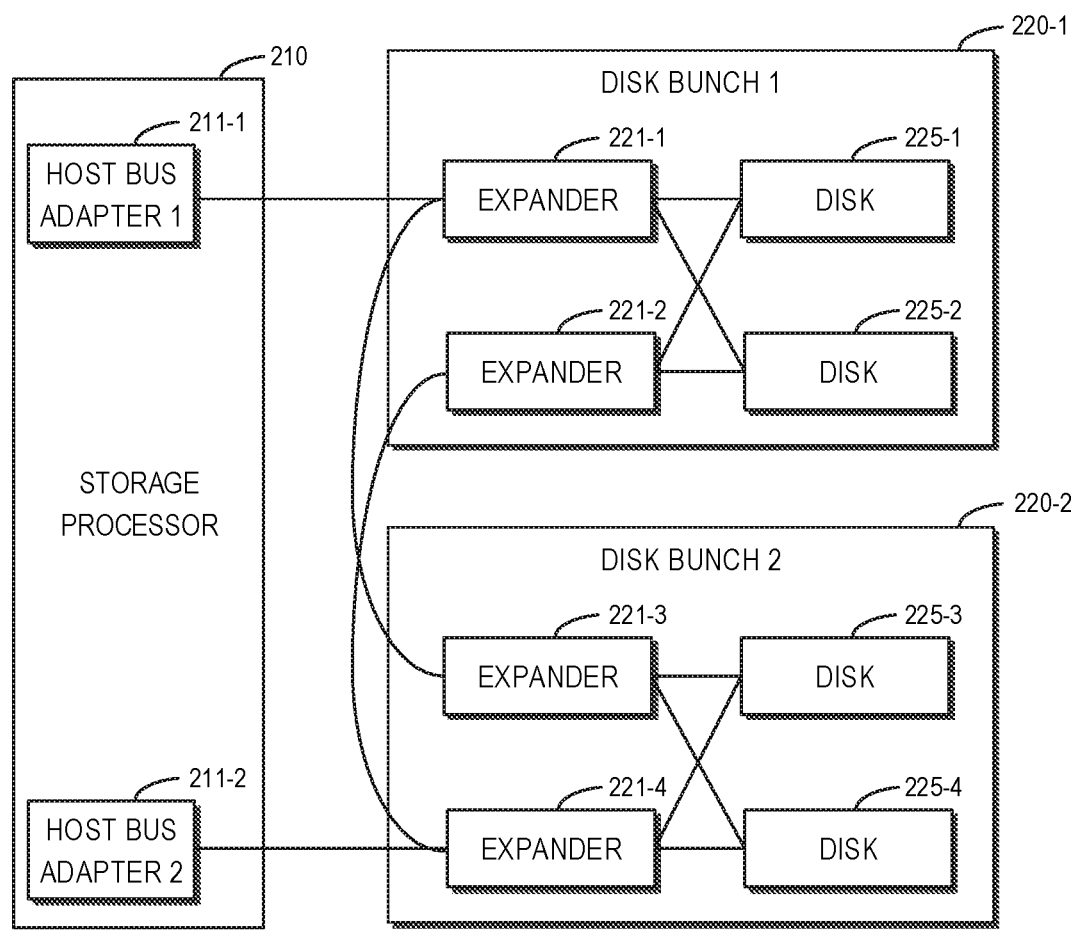
FIG. 2 illustrates several possible component maintenance cases.

FIG. 2 illustrates several possible maintenance cases of the component 121. FIG. 2 illustrates several types of components 121. For example, the component 121 may include host bus adapters 211-1, 211-2, expanders 221-1, 221-2, 221-3, 221-4, and disks 225-1, 225-2, 225-3, 225-4, as shown in FIG. 2. Disk bunches 220-1, 220-2 may include disk arrays. For example, the disk array of the disk bunch 1 220-1 includes disks 225-1, 225-2. The expanders 221-1, 221-2, 221-3, 221-4 may serve as routers for disks 225-1, 225-2, 225-3, 225-4. The host bus adapters 211-1, 211-2 are respectively connected to expanders 221-1, 221-4, such that the storage processor 210 may control disks 225-1, 225-2, 225-3, 225-4. The number of components as shown in FIG. 2 is only an example, without limitation. For example, in addition to the disk bunch 1 220-1 and the disk bunch 2 220-2, there may be further disk bunches, depending on the storage capability of the storage system.

When an error of the disk 225-1 is detected, it means that the disk 225-1 is a dying disk and required to be replaced with a new disk. Moreover, there is a case of requiring downloading a new disk firmware. These cases may be called "disk maintenance."

When a problematic expander 221-1 (which may also be referred to as a link control card (LCC)) is detected, it means that a new expander is required to substitute the expander 221-1. Furthermore, there is a case of requiring downloading a new expander firmware. These cases may be called "expander maintenance."

When a problematic host bus adapter 211-1 (which may also be referred to as a small logical interface card (SLIC) of a serial attached small computer system interface (SAS)) is detected, it means that a new host bus adapter is required to substitute the host bus adapter 211-1. Moreover, there a case of requiring downloading a new host bus adapter firmware or adding a new SLIC card for storage expansion. These cases may be called "host bus adapter maintenance."

When a problematic storage processor 210 needs to be swapped with a new storage processor, this case may be called "storage processor maintenance."

When a new disk array or new disk bunch needs to be added for the purpose of storage expansion, a new disk array enclosure (DAE) is added. Sometimes, the user 110 suspects that a problem is contained in the backplane of the DAE (on which an interface circuit that connects a disk is disposed), and then the DAE needs to be replaced. These cases may be called "disk array enclosure maintenance."

It would be noted that multiple maintenance cases of the component 121 as described above are provided only as an example, but is not intended to be exhaustive. The component maintenance operations as described above may have a great impact on the business running of the storage system 120. Embodiments of the present disclosure provide a non-disruptive maintenance solution.

Figure 3:
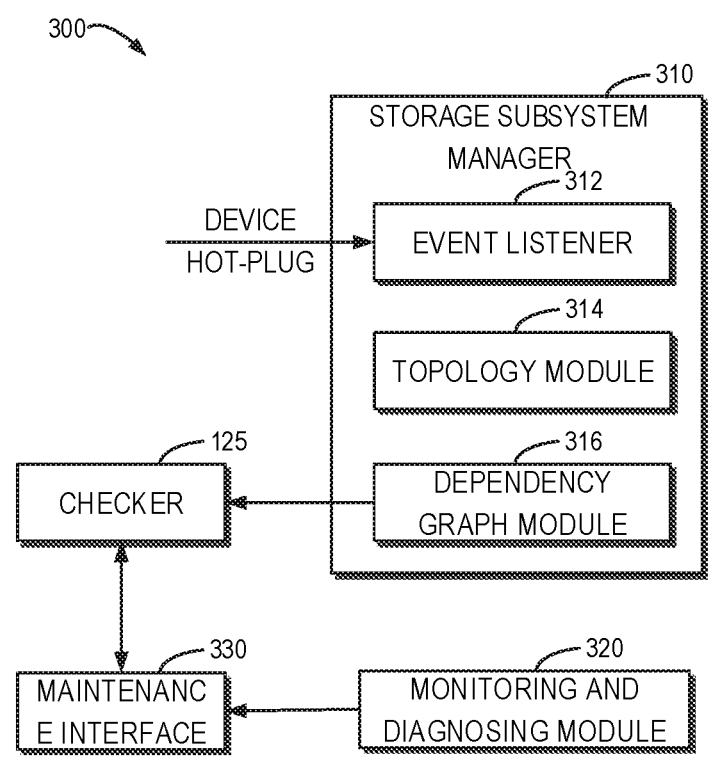
FIG. 3 illustrates a schematic diagram of an architecture for maintaining a component of a storage system.

FIG. 3 illustrates a schematic diagram of an architecture 300 for maintaining a component of a storage system. It is to be understood that the structure and function of the architecture 300 are depicted only for the purpose of illustration without suggesting any limitation to the scope of the present disclosure. Embodiments of the present disclosure may be embodied in different structures and/or functions.

The architecture 300 may generally include a storage subsystem manager 310, a monitoring and diagnosing module 320, a maintenance interface 330 and the checker 125 as shown in FIG. 1. The storage subsystem manager 310 may be a device for managing the storage system 120. The storage subsystem manager 310 may include three components: an event listener 321, a topology module 314 and a dependency graph module 316. The event listener 312 may monitor a hot-plug event, for example, performed by the user 110 and notify the topology module 314 of a device status change caused by the hot-plug event. The topology module 314 maintains topology information of local nodes of the storage system 120. When the event listener 312 monitors a hot-plug event, the topology module 314 updates the topology information timely. The dependency graph module 316 may generate a dependency graph based on the topology information of the topology module 314, for use by the checker 125. Based at least on the dependency graph generated by the dependency graph module 316, the checker 125 may make a decision whether a particular component 121 may be replaced or upgraded safely, without business downtime. This will be discussed in detail below.

The monitoring and diagnosing module 320 may be provided for monitoring and diagnosing health of various components 121 of the storage system 120. Using a sensor technique and an enhanced hardware design, the monitoring and diagnosing module 320 may detect the error or failure of the component 121. For example, the monitoring and diagnosing module 320 may monitor a peripheral component interconnect express (PCIe), a host bus adapter (HBA), a disk array in a serial attached small computer system interface (SAS) domain and the like. Based on sensor data, a system management event, an existing historical log and the like, the monitoring and diagnosing module 320 may make a component health diagnosis and failure prediction. In some embodiments, if a problematic component 121 is detected, the monitoring and diagnosing module 320 may send an alert to the user 110. Then, the user 110 may instruct the maintenance interface 330 to replace or upgrade the problematic component 121.

The maintenance interface 330 may support various types of component maintenance. As shown in FIG. 2, the component maintenance may include: disk maintenance, expander maintenance, host bus adapter (HBA) maintenance, disk array enclosure (DAE) maintenance, capacity expansion, controller maintenance, storage processor (SP) maintenance and the like. For example, when the user 110 wants to replace a bad serial attached small computer system interface (SAS) card, the user 110 may input a request to the maintenance interface 330. In embodiments of the present disclosure, the maintenance interface 330 may operate with the checker 125, so as to determine whether a request for maintaining the SAS card may be allowed without a system downtime.

Figure 4:
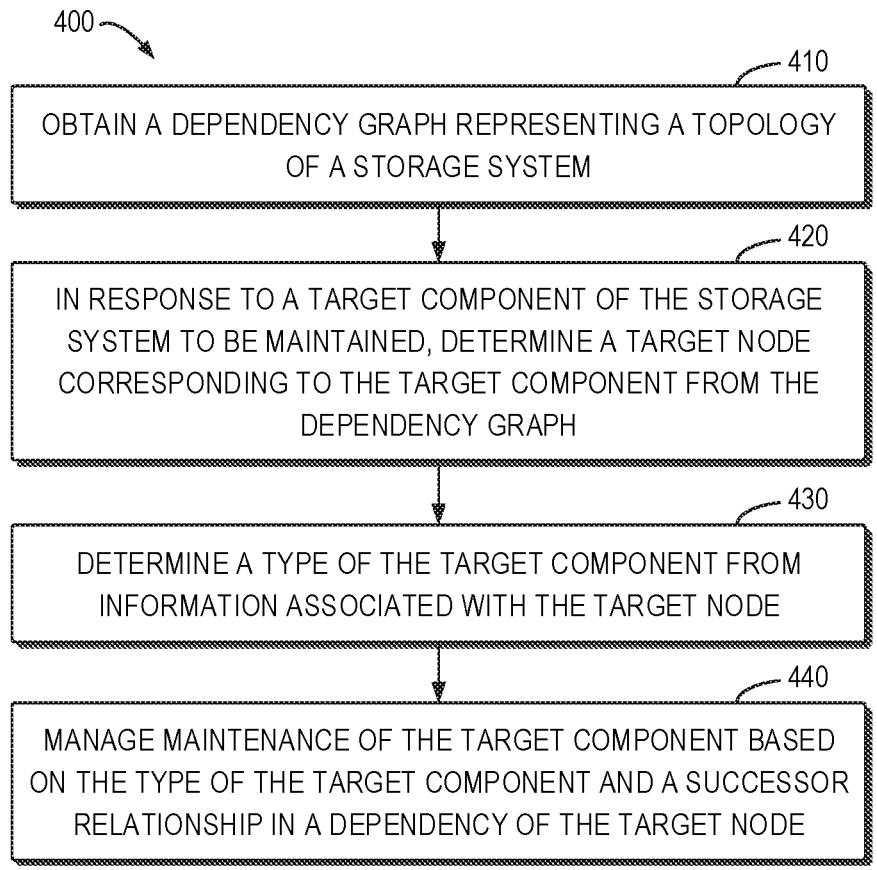
FIG. 4 illustrates a flowchart of a method of maintaining a component of a storage system according to one or more embodiments of the present disclosure.

FIG. 4 illustrates a flowchart of a method 400 of maintaining a component of a storage system according to an embodiment of the present disclosure. For example, the method 400 may be implemented by the checker 125 as shown in FIG. 1 or FIG. 3. It is to be appreciated that the method 400 may further include additional blocks not shown and/or omit some blocks as shown. The scope of the present disclosure is not limited in this regard.

At 410, the checker 125 may obtain a dependency graph representing a topology of the storage system 120. The checker 125 may obtain the dependency graph from the dependency graph module 316 as shown in FIG. 3. The dependency graph module 316 may map the entire storage topology of the topology module 314 into a directed dependency graph, for use by the checker 125.

Figure 5:
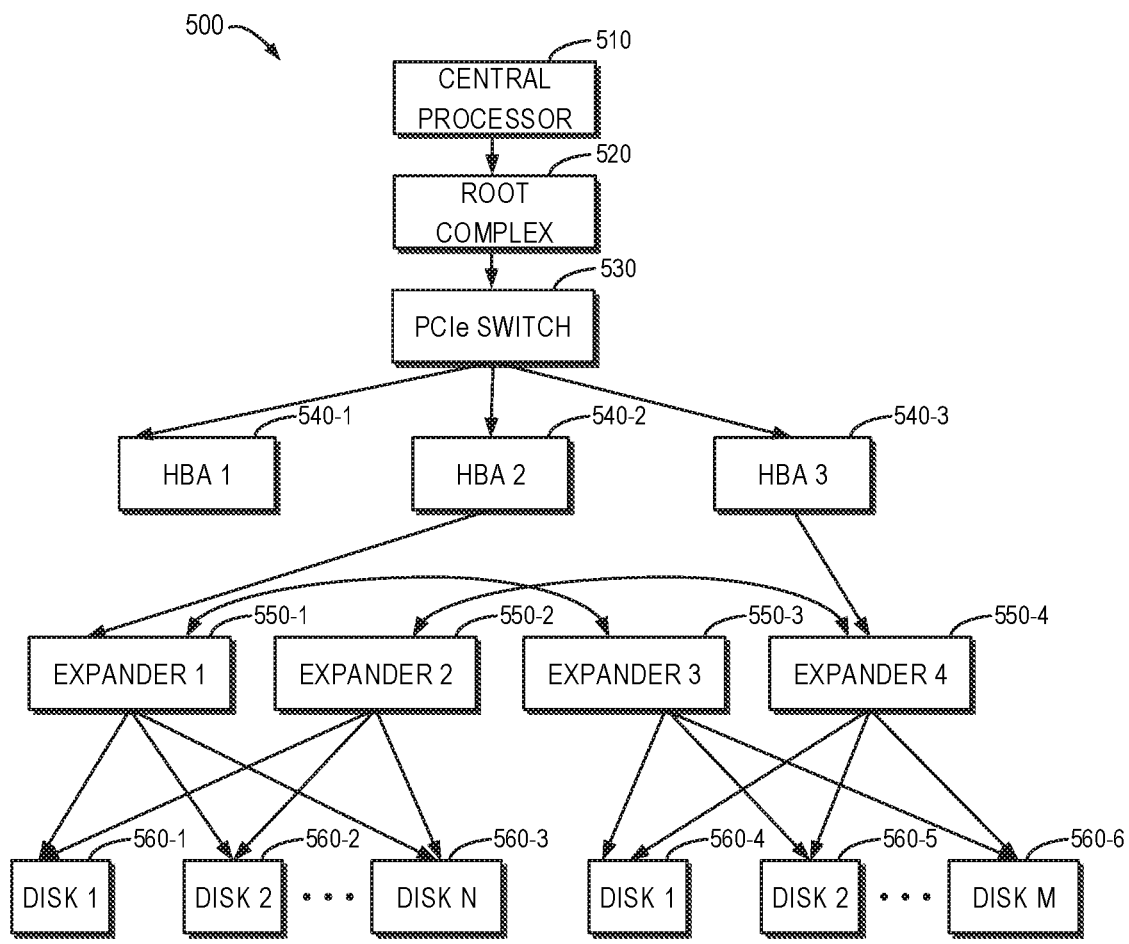
FIG. 5 illustrates an example of a topology of a storage system.

FIG. 5 illustrates an example of a topology 500 of a storage system. As shown in FIG. 5, an upstream of the topology 500 starts from a central processor 510 down to a root complex 520. The root complex 520 refers to a hub module that connects the central processor 510 and an external device system. The topology 500 proceeds from the root complex 520 down to a peripheral component interconnect express (PCIe) switch 530, and then to a host bus adapter (HBA) 1 540-1, a HBA 2 540-2, a HBA 3 540-3. The topology 500 proceeds from HBA 2 540-2 down to an expander 1 550-1, and proceeds from HBA 3 540-3 down to an expander 4 550-4. The expander 1 550-1 is interconnected with an expander 3 550-3. The expander 4 550-4 is interconnected with an expander 2 550-2. Finally, the topology 500 proceeds from the expanders down to endpoint devices such as disks or the like. For example, the topology 500 proceeds from the expander 1 550-1 and the expander 2 550-2 down to a first group of disks which includes a disk 1 560-1, disk 2 560-2, disk N 560-3 and the like. The topology 500 proceeds from the expander 3 550-3 and the expander 4 550-4 down to a second group of disks which includes a disk 1 560-4, disk 2 560-5, disk M 560-6 and the like. The alphabets N and M in the disk N and the disk M respectively represent the number of disks in each group of disks, and may be any positive integer.

Figure 6:
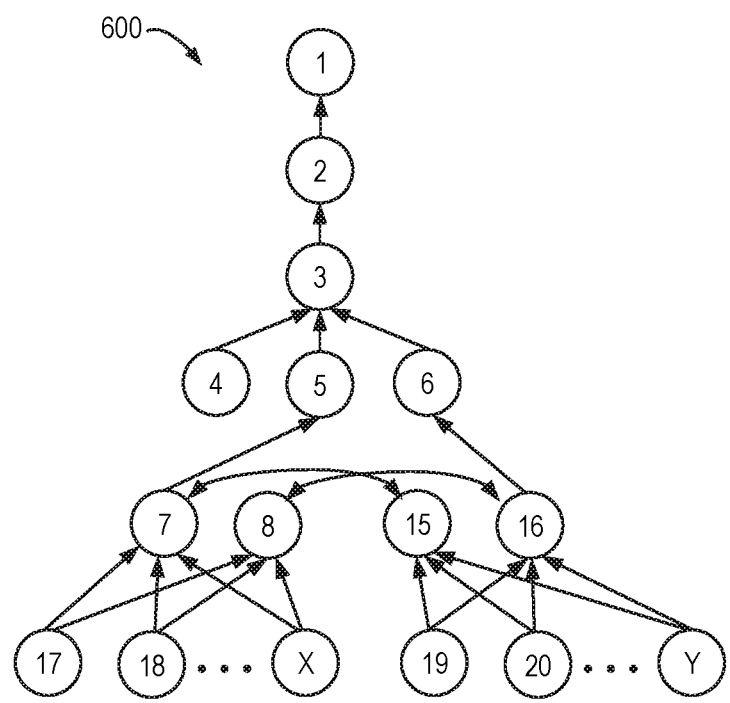
FIG. 6 illustrates a dependency graph representing the topology as shown in FIG. 5.

FIG. 6 illustrates a dependency graph 600 representing the topology 500 as shown in FIG. 5. The dependency graph 600 is built based on the topology 500 of the storage system. The dependency graph 600 includes nodes and directed edges between the nodes. In FIG. 6, the node is represented with a circle, and the directed edge is represented with an arrowed line. The nodes in the dependency graph 600 correspond to respective components 121 of the storage system 120. For example, the components 121 may be those components as shown in FIG. 5. The node 17 in FIG. 6 represents a disk, and nodes 7 and 8 correspond to expanders to which the disk is attached. So long as at least one expander of the nodes 7 and 8 is online, the disk corresponding to the node 17 can work well. The directed edge is used to represent a dependency between two nodes. Each directed edge of the dependency graph 600 points to a predecessor node from a successor node having a dependency. For example, the node 7 may be called the predecessor node of the node 17, while the node 17 is the successor node of the node 7. The checker 125 may use the dependency graph 600 to check whether the non-disruptive maintenance is allowed.

Returning to FIG. 4, at 420, in response to a target component of the storage system to be maintained, the checker 125 determines a target node corresponding to the target component from the dependency graph 600. When the user 110 requests the maintenance interface 330 to replace the target component 121, the maintenance interface 330 first notifies the checker 125 of the target component 121 to be maintained. Subsequently, the checker 125 may determine the node in the dependency graph 600 corresponding to the target component 121, as the target node.

At 430, the checker 125 determines a type of the target component 121 from information associated with the target node. The node in the dependency graph 600 may include at least two types of information: component type and path count. The component type information indicates that the component corresponding to the node is a router (for example, a PCIe switch, HBA or expander) or an endpoint device (for example, a disk). The path count information may indicate the number of paths from the node to a root node. For example, as shown in FIG. 6, the node 1 is the root node which is the predecessor node of all the other nodes. The path counts of the node 5, node 7 and node 17 are respectively 1, 1 and 2.

At 440, the checker 125 may also manage maintenance of the target component 121 based on the type of the target component 121 and a successor relationship in a dependency of the target node. As discussed in detail below, in embodiments of the present disclosure, it may be first determined whether the non-disruptive maintenance is allowed, prior to performing component maintenance in practice.

Figure 7A:
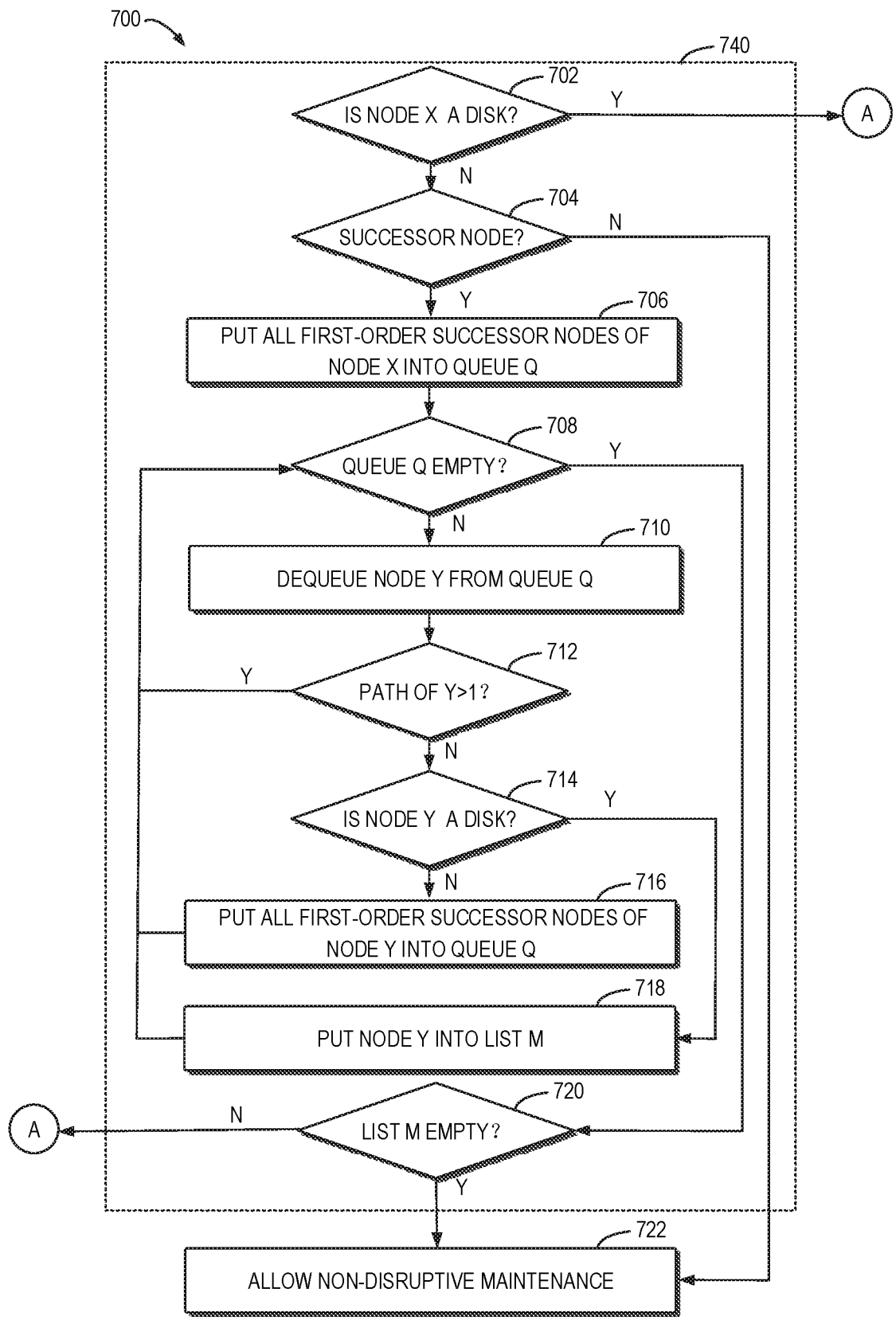
FIGS. 7A and 7B illustrate a flowchart of a method of managing maintenance of a target component according to one or more embodiment of the present disclosure.
Figure 7B:
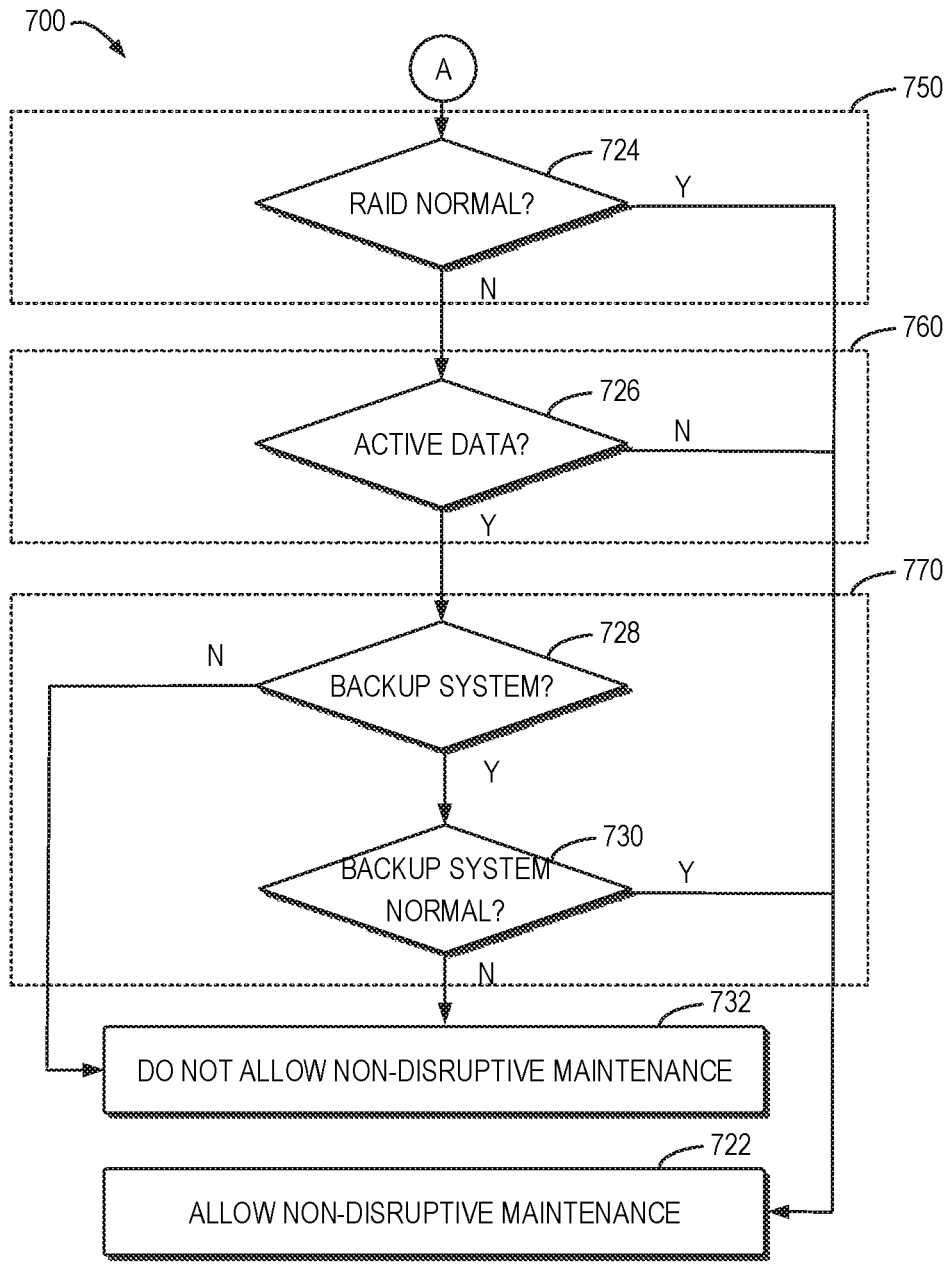

FIG. 7A and FIG. 7B illustrate a flowchart of a method 700 of managing maintenance of a target component according to an embodiment of the present disclosure. For example, the method 700 may be implemented by the checker 125 as shown in FIG. 1 or FIG. 3. It is to be appreciated that the method 700 may further include additional blocks not shown and/or omit some blocks as shown. The scope of the present disclosure is not limited in this regard. The method 700 generally includes four processes: a topology checking process 740, a RAID checking process 750, a data checking process 760 and a backup system checking process 770, wherein FIG. 7A illustrates the topology checking process 740 and FIG. 7B illustrates the other three processes.

The algorithm and logic of the topology checking process 740 as shown in FIG. 7A may be described below. It is assumed that the determined target node to be maintained is the node X (hereinafter referred to as target node X) in the dependency graph. At 702, based on the component type information associated with the target node X, the checker 125 determines that the target component corresponding to the target node X is a disk or a router. If the target component corresponding to the target node X is a disk (i.e., an endpoint device), the target node X does not affect other nodes because it has no successor node. However, if the target node X is removed, it may destroy the RAID running currently. Hence, the RAID checking process 750 needs to be performed. That is, the method 700 will move to 724, which will be described in more detail below.

If it is determined at 702 that the target component corresponding to the target node X is not a disk but a router, the method 700 moves to 704 to determine whether the target node X has a successor node. If it is determined that the target node X has no successor node, it means that removing the target node X may not affect other nodes. The method 700 moves to 722 to allow non-disruptive maintenance (i.e., maintaining the target component while the storage system 120 is operating normally). In this way, embodiments of the present disclosure may support component maintenance without system downtime.

If the target node X has a successor node, all the impacted disk nodes should be checked through the RAID checking process 750. In some embodiments, if it is determined that the target node X has a successor node, the checker 125 determines whether the target node X is a sole predecessor node of the successor node. The "sole predecessor node" herein refers to that the path from the successor node to the root node definitely passes through the target node X. For example, the impacted disk nodes are those nodes whose path counts are 1 (not multipath) and on the paths of which the target node X is located. If the target node X is determined to be the sole predecessor node of the successor node, the checker 125 may determine whether components corresponding to all successor nodes of the target node X include a disk. Here, "all successor nodes of the target node X" refers to a successor node of the target node X and a node depending on the successor node. In this way, the checker 125 may collect all the impacted disks, to make these disks to be checked through the RAID checking process 750 later.

For example, a breadth-first-search (BFS) algorithm may be used to collect all of impacted disks. If it is determined at 704 that the target node X has a successor node, the method 700 moves to 706 where all first-order successor nodes (adjacent successor nodes) of the target node X may be put into a queue Q. For example, the queue Q may be a First-in First-out (FIFO) queue. At 708, the checker 125 determines whether the queue Q is empty. If the queue Q is not empty, a node Y in the queue Q is dequeued from the queue Q at 710. At 712, the checker 125 checks whether the path count of the node Y is greater than 1 (whether it is multipath). If the path count of the node Y is greater than 1, which means that removing the target node X will not impact the node Y, the method 700 returns to 708. If the path count of the node Y is not greater than 1, it is determined at 714 whether the component corresponding to the node Y is a disk. If yes, the node Y is added to a list M at 718, and the method 700 then returns to 708. The list M is used to store all of the impacted disks. If the component corresponding to the node Y is not a disk, all the first-order successor nodes of the node Y are put into the queue Q at 716. The method 700 then returns to 708. In this way, the checker 125 may traverse all the successor nodes directly or indirectly depending on the target node X, so as to determine whether a particular successor node may be routed in a manner except that of the target node X, and find the impacted disk nodes.

If it is determined at 708 that the queue Q is empty, the method 700 moves to 720 to determine whether the list M is empty. If the list M is empty, there is no impacted disk, and the non-disruptive maintenance is allowed at 722. If the list M is not empty, the list M is transmitted to the RAID checking process 750 for further processing.

The RAID checking process 750 as shown in FIG. 7B will be described below. If it is determined at 702 that the target component corresponding to the target node X is a disk, the method 700 moves to 724. The checker 125 may use RAID mapping and status information of the storage system 120 to determine whether a redundant array of independent disks (RAID) related to the disk may operate normally while the disk is shut down. If it is determined that the RAID may operate normally while the disk is shut down, at 722 the target component is allowed to be maintained while the storage system 120 is operating normally.

If it is determined at 720 that the list M is not empty, the method 700 also moves to 724. The disk list M provided by the topology checking process 740 may be mapped to the RAID groups, and it is checked whether each associated RAID can tolerate the related disk failure.

Figure 8:
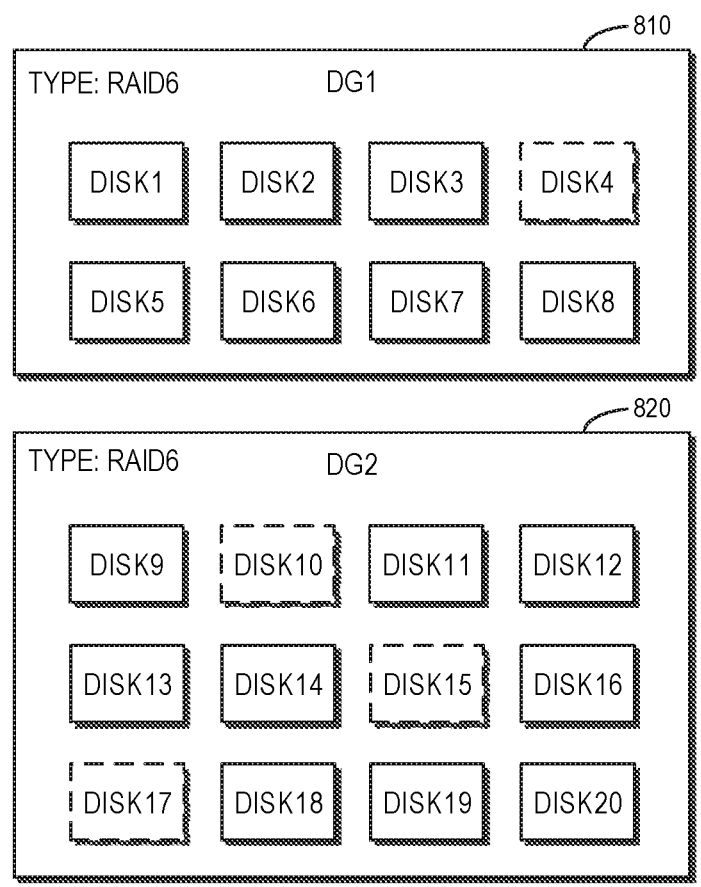
FIG. 8 illustrates an example of RAID information.

FIG. 8 illustrates an example of RAID information. FIG. 8 illustrates two RAID groups, namely DG1 810 including 8 disks and DG2 820 including 12 disks. The two RAID groups are both of RAID 6 type, i.e., the RAID group can tolerate simultaneous failure of at most two disks. The disks with the dotted blocks in FIG. 8 are impacted disks. Since DG1 810 has only one failed disk (disk 4), the DG1 810 may operate normally while the disk 4 is temporarily offline. In contrast, the DG2 820 contains three failed disks (the disk 10, disk 15 and disk 17) which exceed the fault tolerance capacity of the DG2 820. As a result, the DG2 820 fails to operate normally. In this case, the checker 125 may enable the impacted RAID to go through the data checking process 760.

The data checking process 760 as shown in FIG. 7B will be described below. If the RAID fails to operate normally while the disk is shut down, at 726 the checker 125 may determine whether data stored in the RAID is active data. If not, the non-disruptive maintenance is allowed at 722. If the data stored in the RAID is active data, the method 700 may go through the backup system checking process 770.

The term "active data" means that the data cannot be offline. Active data and inactive data are respectively stored in different data tiers. The checker 125 may use the type of the data tier to determine whether data is active data. The data tier type may indicate a hot data level from a user's perspective. Hot data and cold data are typically distributed in different disks. For example, a system may have an active tier, archive tier, cache tier and cloud tier. The cache tier uses a solid-state drive (SSD) disk, the archive tier uses a serial advanced technology attachment (SATA) disk, and the active tier uses a disk of an SAS interface type with a fast access rate. The data in the archive tier and the cloud tier may be temporarily offline without affecting the business. If the user allows a temporary performance degradation, the cache tier may be offline as well. However, offlining of the data at the active tier will result in the storage system 120 being unusable or its use being degraded. The checker 125 may use tier information of data on the disk to determine whether non-disruptive maintenance is allowed for the disk.

Figure 9:
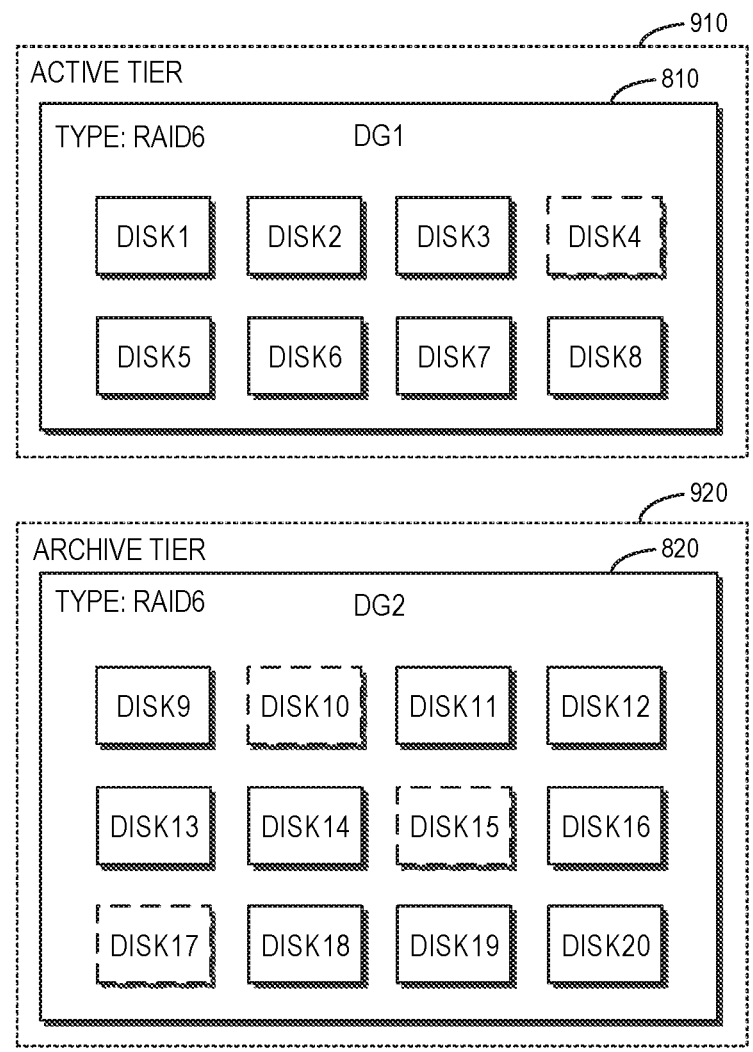
FIG. 9 illustrates an example of data tier information of RAID as shown in FIG. 8.

FIG. 9 illustrates an example of data tier information of the RAID as shown in FIG. 8. As shown in FIG. 9, RAID DG1 810 is at an active tier 910, and RAID DG2 820 is at an archive tier 920. Because the data in the archive tier 920 is inactive data, the data checking process 760 may return "allowing non-disruptive maintenance" when the RAID checking process 750 only reports that the DG2 820 fails to operate normally (the DG1 810 can tolerate offline of one disk). When the RAID checking process 750 reports that both of the DG1 810 and DG2 820 fail to operate normally, the backup system checking process 770 may be performed because DG1 810 is at the active layer 910.

The backup system checking process 770 as shown in FIG. 7B will be described below. If the backup system checking process 770 receives a failed active tier from the data checking process 760, the checker 125 will check whether the storage system 120 is a high available system. In other words, if the data stored in the RAID is active data, the checker 125 may determine whether a backup storage system is available. The checker 125 may maintain high available health information and use the information to check whether a high available failover is allowed. As an example, at 728, the checker 125 may determine whether there is a backup storage system. If not (which means that the storage system 120 is not a high available system), the checker 125 may make a decision of not allowing non-disruptive maintenance at 732. If there exists a backup storage system, the checker 125 may determine whether the backup storage system is in a normal mode (whether it is healthy) at 730. If not, the checker 125 may make a decision of not allowing non-disruptive maintenance at 732. If the backup storage system is in a normal mode, non-disruptive maintenance is allowed at 722.

The checker 125 may make a final decision based on one or more of topology information, RAID information, data tier information and a high available status. Therefore, the checker 125 may make a decision on whether non-disruptive maintenance is allowed based on multi-dimensional information, thereby improving effectiveness of embodiments of the present disclosure.

The checker 125 may return, to the maintenance interface 330, the decision on whether the non-disruptive maintenance is allowed. If the checker 125 determines not to allow the non-disruptive maintenance, the maintenance interface 330 will maintain the target component in a downtime of the storage system 120. If the checker 125 uses the backup system checking process 770 and determines to allow the non-disruptive maintenance, the maintenance interface 330 will use the backup storage system to perform component maintenance. During component maintenance, the running business of the storage system 120 is handed over to the backup storage system (its backup nodes), but it appears to the user 110 that the storage system 120 may still be used normally.

As described above, such a system-level high available failover supported also by the existing methods incurs a considerable computing cost and resource cost. In embodiments of the present disclosure, with the preceding topology checking process 740, RAID checking process 750 and data checking process 760, the lightweight checking logic is utilized as much as possible, to avoid a high available failover (the backup system checking process 770). The high available failover is only used as a last resort, to reduce the costs significantly.

Figure 10:
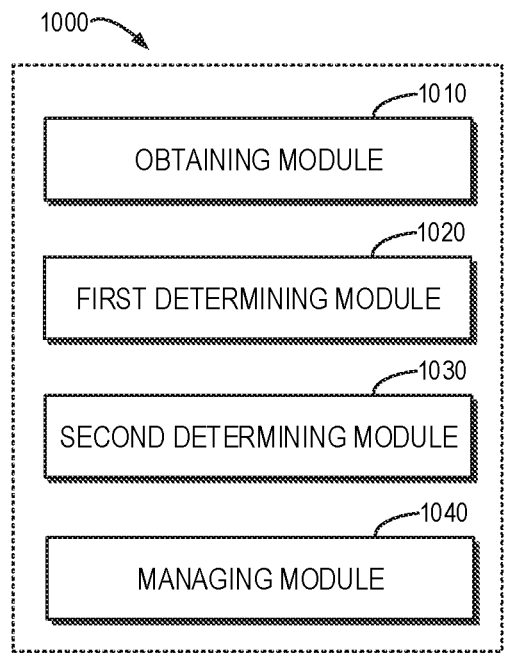
FIG. 10 illustrates a block diagram of an apparatus for maintaining a component of a storage system according to one or more embodiment of the present disclosure.

FIG. 10 illustrates a block diagram of an apparatus 1000 for maintaining a component of a storage system according to an embodiment of the present disclosure. In some embodiments, the apparatus 1000 may be implemented at the checker 125, for example. Alternatively, in some embodiments, the apparatus 1000 may be directly implemented as the checker 125 per se, that is, the checker 125 may be implemented by the apparatus 1000.

As shown in FIG. 10, the apparatus 1000 may include an obtaining module 1010 which is configured to obtain a dependency graph representing a topology of the storage system, wherein the dependency graph includes nodes and directed edges between the nodes, the nodes correspond to respective components of the storage system, and each of the directed edges points to a predecessor node from a successor node having a dependency. The apparatus 1000 may further include a first determining module 1020 which is configured, in response to a target component of the storage system to be maintained, to determine a target node corresponding to the target component from the dependency graph. The apparatus 1000 may further include a second determining module 1030 which is configured to determine a type of the target component from information associated with the target node. Moreover, the apparatus 1000 may further include a management module 1040 which is configured to manage maintenance of the target component based on the type of the target component and a successor relationship in a dependency of the target node.

In some embodiments, the management module 1040 may include: a first determining submodule which is configured, in response to determining that the target component is a router, to determine whether the target node has a successor node; and a first allowing submodule which is configured, in response to missing the successor node of the target node, to allow the target component to be maintained while the storage system is operating normally.

In some embodiments, the management module 1040 may include: a second determining submodule which is configured, in response to determining that the target component is a disk, to determine whether a redundant array of independent disks related to the disk can operate normally while the disk is shut down; and a second allowing submodule which is configured, in response to determining that the redundant array of independent disks can operate normally while the disk is shut down, to allow the target component to be maintained while the storage system is operating normally.

In some embodiments, the management module 1040 may include: a third determining submodule which is configured, in response to determining that the redundant array of independent disks fails to operate normally while the disk is shut down, to determine whether data stored in the redundant array of independent disks is active data; and a third allowing submodule which is configured, in response to determining that the data is inactive data, to allow the target component to be maintained while the storage system is operating normally.

In some embodiments, the management module 1040 may include: a fourth determining submodule which is configured, in response to determining that the data is active data, to determine whether a backup storage system is available; a fourth allowing submodule which is configured, in response to determining that the backup storage system is available, to allow the target component to be maintained while the storage system is operating normally; and a first maintaining submodule which is configured, in response to determining that the backup storage system is unavailable, to maintain the target component in a downtime of the storage system.

In some embodiments, the management module 1040 may include: a fifth determining submodule which is configured, in response to determining that the target node has a successor node, to determine whether the target node is a sole predecessor node of the successor node; a sixth determining submodule which is configured, in response to determining that the target node is the sole predecessor node of the successor node, to determine whether components corresponding to all successor nodes of the target node comprises a disk; a seventh determining submodule which is configured, in response to determining that the components comprise a disk, to determine whether a redundant array of independent disks related to the disk can operate normally while the disk is shut down; and a fifth allowing submodule which is configured, in response to determining that the redundant array of independent disks can operate normally while the disk is shut down, to allow the target component to be maintained while the storage system is operating normally.

In some embodiments, the management module 1040 may include: an eighth determining submodule which is configured, in response to determining that the target node has a successor node, to determine whether the target node is a sole predecessor node of the successor node; and a sixth allowing submodule which is configured, in response to determining that the successor node has a further predecessor node or that the target node is the sole predecessor node of the successor node but components corresponding to all successor nodes of the target node are devices other than disks, to allow the target component to be maintained while the storage system is operating normally.

In some embodiments, the components comprise hardware, software or firmware.

In some embodiments, the apparatus 1000 may further include: a detecting module which is configured to detect a hot-plug event of the storage system; an updating module which is configured, in response to detecting that a hot-plug event occurs, to update the topology of the storage system; and a generating module which is configured to generate the dependency graph based on the updated topology.

In some embodiments, the fourth allowing submodule may include a handing over unit which is configured to hand over an operation of the storage system to the backup storage system.

For the sake of clarity, some optional modules of the apparatus 1000 are not shown in FIG. 10. However, it is to be understood that various features as described with reference to FIGS. 1-9 are likewise applicable to the apparatus 1000. Furthermore, various modules of the apparatus 1000 may be hardware modules or software modules. For example, in some embodiments, the apparatus 1000 may be partially or completely implemented using software and/or firmware, e.g., implemented as a computer program product embodied on a computer readable medium. Alternatively or additionally, the apparatus 1000 may be partially or completely implemented based on hardware, for example, implemented as an integrated circuit (IC) chip, an application specific integrated circuit (ASIC), a system on chip (SOC), a field programmable gate array (FPGA) and so on. The scope of the present invention is not limited in this aspect.

Figure 11:
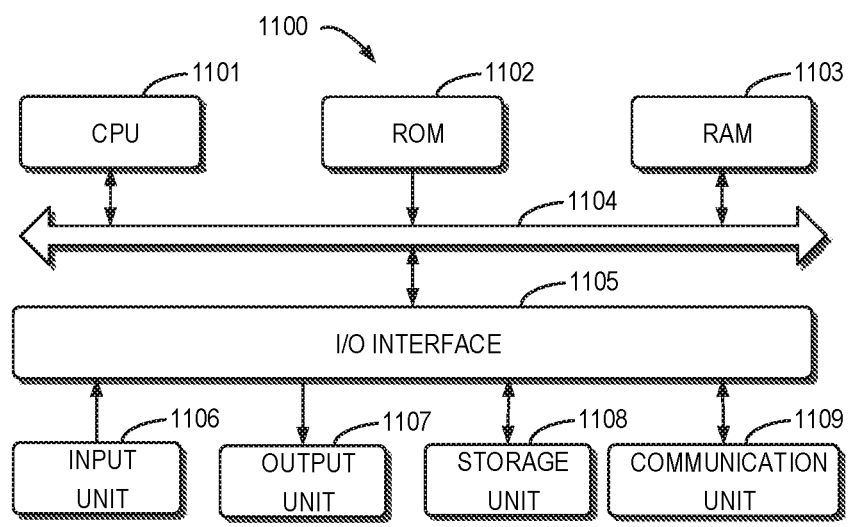
FIG. 11 illustrates a schematic block diagram of an example device that may be used to implement one or more embodiments of the present disclosure.

FIG. 11 illustrates a schematic block diagram of an example device 1100 that may be used to implement embodiments of the present disclosure. As indicated, the device 1100 includes a central processing unit (CPU) 1101 which can perform various appropriate actions and processes based on computer program instructions stored in a read-only memory (ROM) 1102 or computer program instructions loaded from a storage unit 1108 into a random access memory (RAM) 1103. In RAM 1103, there are also stored various programs and data required by the device 1100 when operating. The CPU 1101, ROM 1102 and RAM 1103 are connected to one another via a bus 1104. An input/output (I/O) interface 1105 is also connected to the bus 1104.

A plurality of components of the device 1100 are connected to the I/O interface 1105, including: an input unit 1106 comprising a keyboard, a mouse, and the like; an output unit 1107, such as various types of displays, loudspeakers, and the like; a storage unit 1108 including a magnetic disk, an optical disk, and the like; and a communication unit 1109 including a LAN card, a modem, a wireless communication transceiver and so on. The communication unit 1109 allows the device 1100 to exchange information/data with other devices via a computer network, such as the Internet, and/or various telecommunications networks.

The above-described procedures and processes, such as the methods 400 and 700, can be implemented by the processing unit 1101. For example, in some embodiments, the methods 400 and 700 can be implemented as a computer software program which is tangibly embodied on a machine readable medium, for instance, the storage unit 1108. In some embodiments, part or all of the computer program can be loaded to and/or installed on the device 1100 via the ROM 1102 and/or the communication unit 1109. The computer program, when loaded to the RAM 1103 and executed by the CPU 1101, may execute one or more acts of the methods 400 and 700 as described above. Alternatively, the CPU 1101 can also be configured to implement the methods 400 and 700 as described above in any other proper manner (for example, by means of firmware).

The present disclosure provides a non-disruptive maintenance method, which may support component maintenance without system downtime. The method improves effectiveness of the algorithm based on multi-dimensional system information including topology, RAID, data storage tier, high available information and the like. Such a method may be applied to non-downtime maintenance of all kinds of components including hardware, software and firmware, and incur a low running cost.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of maintaining components of a storage system, comprising:
   obtaining a dependency graph representing a topology of the storage system, the dependency graph comprising nodes and directed edges between the nodes, the nodes corresponding to respective components of the storage system;
   detecting a hot-plug event of the storage system;
   in response to detecting the hot-plug event, updating the topology of the storage system;
   generating the dependency graph based on the updated topology;
   determining a target node corresponding to a target component from the dependency graph;
   determining a type of the target component from information associated with the target node; and
   managing maintenance of the target component based on the type of the target component and a successor relationship in a dependency of the target node by allowing the target component to be maintained while the storage system is operating normally.

2. The method of claim 1, wherein managing maintenance of the target component comprises:
   in response to a first determination that the target component is a router, making a second determination that the target node does not have a successor node; and
   in response to the second determination, allowing the target component to be maintained while the storage system is operating normally.

3. The method of claim 1, wherein managing maintenance of the target component comprises:
   in response to a first determination that the target component is a disk, making a second determination that a redundant array of independent disks related to the disk operates normally while the disk is shut down; and
   in response to the second determination, allowing the target component to be maintained while the storage system is operating normally.

4. The method of claim 1, wherein managing maintenance of the target component further comprises:
   in response to a first determination that the target component is a disk, making a second determination that a redundant array of independent disks related to the disk fails to operate normally while the disk is shut down,
   in response to the second determination, making a third determination that data stored in the redundant array of independent disks is inactive data; and
   in response to the third determination, allowing the target component to be maintained while the storage system is operating normally.

5. The method of claim 1, wherein managing maintenance of the target component further comprises:
   in response to a first determination that the target component is a disk, making a second determination that data is active data and that a backup storage system is available;
   in response to the second determination, allowing the target component to be maintained while the storage system is operating normally.

6. The method of claim 5, wherein allowing the target component to be maintained while the storage system is operating normally in response to determining that the backup storage system is available comprises:
   handing over an operation of the storage system to the backup storage system.

7. The method of claim 1, wherein managing maintenance of the target component further comprises:
   in response to a first determination that the target component is a router, making a second determination that the target node has a successor node and that the target node is a sole predecessor node of the successor node;
   in response to the second determination, making a third determination that the successor node comprises a disk;
   in response to the third determination, making a fourth determination that a redundant array of independent disks related to the disk operates normally while the disk is shut down; and
   in response to the fourth determination, allowing the target component to be maintained while the storage system is operating normally.

8. The method of claim 1, wherein managing maintenance of the target component further comprises:
   in response to a first determination that the target node has a successor node, making a second determination that the target node is a sole predecessor node of the successor node; and
   in response to the second determination, making a third determination that components corresponding to the successor node are devices other than disks; and
   in response to the third determination, allowing the target component to be maintained while the storage system is operating normally.

9. The method of claim 1, wherein the target component comprises hardware, software or firmware.

10. An electronic device, comprising:
    at least one processing unit; and
    at least one memory coupled to the at least one processing unit and storing instructions executable by the at least one processing unit, the instructions, when executed by the at least one processing unit, causing the electronic device to, the method comprising:
    obtain a dependency graph representing a topology of a storage system, the dependency graph comprising nodes and directed edges between the nodes;
    detect a hot-plug event of the storage system;
    in response to detecting the hot-plug event, update the topology of the storage system;
    generate the dependency graph based on the updated topology;
    determine a target node corresponding to a target component from the dependency graph;

determine a type of the target component from information associated with the target node; and manage maintenance of the target component based on the type of the target component and a successor relationship in a dependency of the target node by allowing the target component to be maintained while the storage system is operating normally.

11. The electronic device of claim 10, wherein managing maintenance of the target component comprises:
in response to making a first determination that the target component is a router, making a second determination that the target node does not have a successor node; and
in response to the second determination, allowing the target component to be maintained while the storage system is operating normally.

12. The electronic device of claim 10, wherein managing maintenance of the target component comprises:
in response to a first determination that the target component is a disk, making a second determination that a redundant array of independent disks related to the disk operates normally while the disk is shut down; and
in response to the second determination, allowing the target component to be maintained while the storage system is operating normally.

13. The electronic device of claim 10, wherein managing maintenance of the target component further comprises:
in response to a first determination that the target component is a disk, making a second determination that a redundant array of independent disks fails to operate normally while the disk is shut down and that data stored in the redundant array of independent disks is inactive data; and
in response to the second determination, allowing the target component to be maintained while the storage system is operating normally.

14. The electronic device of claim 10, wherein managing maintenance of the target component further comprises:
in response to making a first determination that the target component is a disk, making a second determination that a redundant array of independent disks fails to operate normally while the disk is shut down and that data stored in the redundant array of independent disks is active data;
in response to the second determination, making a third determination that a backup storage system is available;
in response to the third determination, allowing the target component to be maintained while the storage system is operating normally.

15. The electronic device of claim 10, wherein managing maintenance of the target component further comprises:
in response to making a first determination that the target component is a router, making a second determination that the target node has a successor node;
in response to the second determination, making a third determination that the target node is the sole predecessor node of the successor node and that the successor node comprises a disk;
in response to the third determination, making a fourth determination that a redundant array of independent disks related to the disk operates normally while the disk is shut down; and
in response to the fourth determination, allowing the target component to be maintained while the storage system is operating normally.

16. The electronic device of claim 10, wherein managing maintenance of the target component further comprises:
in response to a first determination that the target node has a successor node, making a second determination that the target node is a sole predecessor node of the successor node; and
in response to the second determination, making a third determination that components corresponding to the successor node are devices other than disks; and
in response to the third determination, allowing the target component to be maintained while the storage system is operating normally.

17. A computer program product being tangibly stored on a non-transient computer-readable medium and comprising machine-executable instructions which, when executed, cause a machine:
obtain a dependency graph representing a topology of the storage system, the dependency graph comprising nodes and directed edges between the nodes, the nodes corresponding to respective components of the storage system;
detect a hot-plug event of the storage system;
in response to detecting the hot-plug event, update the topology of the storage system;
generate the dependency graph based on the updated topology;
determine a target node corresponding to a target component from the dependency graph;
determine a type of the target component from information associated with the target node; and
manage maintenance of the target component based on the type of the target component and a successor relationship in a dependency of the target node by allowing the target component to be maintained while the storage system is operating normally.

18. The computer program product of claim 17, wherein managing maintenance of the target component comprises:
in response to making a first determination that the target component is a router, making a second determination that the target node does not have a successor node; and
in response to the second determination, allowing the target component to be maintained while the storage system is operating normally.

* * * * *

UNITED STATES PATENT AND TRADEMARK OFFICE
CERTIFICATE OF CORRECTION

PATENT NO.       : 10,853,191 B2                      Page 1 of 1
APPLICATION NO.  : 16/146879
DATED            : December 1, 2020
INVENTOR(S)      : Bing Liu and Wei Lin It is certified that error appears in the above-identified patent and that said Letters Patent is hereby corrected as shown below:

In the Claims

Column 16, Line 57 in Claim 10, the phrase "device to, the method comprising" should read -- device to, --.

Column 18, Line 26 in Claim 17, the phrase "cause a machine" should read -- cause a machine to --.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*